US012071381B2

(12) United States Patent
Jackson et al.

(10) Patent No.: US 12,071,381 B2
(45) Date of Patent: Aug. 27, 2024

(54) CERAMIC MATRIX COMPOSITE ARTICLE AND METHOD OF MAKING THE SAME

(71) Applicant: Raytheon Technologies Corporation, Farmington, CT (US)

(72) Inventors: Richard Wesley Jackson, Mystic, CT (US); Mary Colby, West Hartford, CT (US); Tyler G. Vincent, Portland, CT (US)

(73) Assignee: RTX Corporation, Farmington, CT (US)

( * ) Notice: Subject to any disclaimer, the term of this patent is extended or adjusted under 35 U.S.C. 154(b) by 529 days.

(21) Appl. No.: 17/541,947

(22) Filed: Dec. 3, 2021

(65) Prior Publication Data

US 2023/0174433 A1   Jun. 8, 2023

(51) Int. Cl.
C04B 35/80 (2006.01)
C04B 41/45 (2006.01)
C04B 41/50 (2006.01)
C04B 41/87 (2006.01)

(52) U.S. Cl.
CPC .......... *C04B 35/80* (2013.01); *C04B 41/4539* (2013.01); *C04B 41/4584* (2013.01); *C04B 41/5027* (2013.01); *C04B 41/5057* (2013.01); *C04B 41/87* (2013.01); *C04B 2235/5216* (2013.01)

(58) Field of Classification Search
CPC . C04B 35/80; C04B 41/4539; C04B 41/4584; C04B 41/5027; C04B 41/5057; C04B 41/87; C04B 2235/5216; F01D 5/28; F01D 5/284; F01D 5/286
See application file for complete search history.

(56) References Cited

U.S. PATENT DOCUMENTS 5,039,562 A   8/1991   Liang
5,198,302 A *  3/1993   Chyung .............. C04B 41/4584
                                                       428/375

(Continued)

FOREIGN PATENT DOCUMENTS

EP   985802    3/2000
EP   1215183   6/2002

(Continued)

OTHER PUBLICATIONS

Extended European Search Report for European Patent Application No. 22210361.6 dated May 10, 2023.

*Primary Examiner* — Ehud Gartenberg
*Assistant Examiner* — Henry Ng
(74) *Attorney, Agent, or Firm* — Carlson, Gaskey & Olds, P.C.

(57) ABSTRACT

A method includes forming a ceramic matrix composite component by infiltrating an array of ceramic-based fibers with a ceramic-based matrix; forming a plurality of cooling holes in the ceramic matrix composite component; applying a slurry of particles in a carrier fluid to the ceramic matrix composite component such that the slurry passes through the cooling holes and wicks into the ceramic matrix composite material; and processing the ceramic matrix composite component to remove the carrier fluid, thereby leaving a filler at a wall surface of the plurality of cooling holes. A component is also disclosed.

18 Claims, 4 Drawing Sheets

(56) References Cited

U.S. PATENT DOCUMENTS

| | | | |
|---|---|---|---|
| 6,627,019 B2* | 9/2003 | Jarmon | C04B 35/80 |
| | | | 264/642 |
| 10,767,489 B2 | 9/2020 | Bunker | |
| 10,995,039 B1* | 5/2021 | Dunn | C04B 35/653 |
| 2005/0118392 A1 | 6/2005 | Millard et al. | |
| 2012/0164376 A1 | 6/2012 | Bunker et al. | |
| 2013/0285296 A1 | 10/2013 | Gray et al. | |
| 2014/0093392 A1* | 4/2014 | Tibbott | F01D 5/188 |
| | | | 29/889.6 |
| 2017/0089578 A1* | 3/2017 | Bunker | F02C 7/12 |
| 2017/0089579 A1* | 3/2017 | Bunker | F23R 3/007 |
| 2019/0085707 A1* | 3/2019 | Xu | F01D 11/08 |
| 2020/0080425 A1* | 3/2020 | Weaver | F01D 9/041 |
| 2020/0255344 A1* | 8/2020 | Carlin | C04B 35/63444 |
| 2021/0047934 A1* | 2/2021 | Whittle | C04B 35/80 |
| 2021/0189902 A1* | 6/2021 | Dyson | F01D 5/282 |
| 2023/0304408 A1* | 9/2023 | Bunker | F04D 29/384 |
| | | | 415/115 |

FOREIGN PATENT DOCUMENTS

| | | |
|---|---|---|
| EP | 3838869 | 6/2021 |
| WO | 2020209848 | 10/2020 |

* cited by examiner

CERAMIC MATRIX COMPOSITE ARTICLE AND METHOD OF MAKING THE SAME

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Ceramic matrix composites ("CMC") are being considered for certain gas turbine engine components, and have usefulness in other fields as well. For instance, CMCs can be employed for airfoils in the compressor or turbine sections of a gas turbine engine. Among other attractive properties, CMCs have high temperature resistance. Despite this attribute, however, there are unique challenges to implementing CMCs in airfoils.

SUMMARY

A method according to an exemplary embodiment of this disclosure, among other things includes forming a ceramic matrix composite component by infiltrating an array of ceramic-based fibers with a ceramic-based matrix; forming a plurality of cooling holes in the ceramic matrix composite component; applying a slurry of particles in a carrier fluid to the ceramic matrix composite component such that the slurry passes through the cooling holes and wicks into the ceramic matrix composite material; and processing the ceramic matrix composite component to remove the carrier fluid, thereby leaving a filler at a wall surface of the plurality of cooling holes.

In a further example of the foregoing, the slurry is a first slurry and the particles are a first plurality of particles. The method also includes applying a second slurry having a second plurality of particles. The second plurality of particles have a smaller average particle size than the first plurality of particles.

In a further example of any of the foregoing, after applying the first slurry an inner region of the filler including the first plurality of particles is formed and after applying the second slurry an outer region of the filler including the second plurality of particles is formed.

In a further example of any of the foregoing, the slurry further includes glass additives.

In a further example of any of the foregoing, the slurry further includes a surfactant.

In a further example of any of the foregoing, the infiltration is by chemical vapor.

In a further example of any of the foregoing, the mixture is a colloidal solution.

In a further example of any of the foregoing, the particles are carbides or oxides.

In a further example of any of the foregoing, particles include preceramic polymer particles. The method also includes curing the preceramic polymer particles to form a ceramic.

In a further example of any of the foregoing, the processing occurs during a step of densifying or curing the ceramic matrix composite component.

In a further example of any of the foregoing, the processing occurs during a step of applying a coating to the ceramic matrix composite component.

A component according to an exemplary embodiment of this disclosure, among other things includes a ceramic matrix composite material including an array of ceramic-based fibers disposed in a ceramic-based matrix, a plurality of cooling holes formed through the ceramic matrix composite material, and a filler at a wall surface of each of the plurality of cooling holes. The filler includes a plurality of particles filling in surface roughness at the cooling hole wall surfaces.

In a further example of the foregoing, the filler includes glass additives.

In a further example of any of the foregoing, the cooling holes are film cooling holes having a metering section and a diffuser section.

In a further example of any of the foregoing, the array of ceramic-based fibers includes plies of the ceramic-based fibers. The metering section extends along an axis that is normal to a plane of the plies.

In a further example of any of the foregoing, the ceramic-based matrix has a plurality of pores having an average pore diameter that is up to about 50% of a diameter of the metering section.

In a further example of any of the foregoing, the filler includes an outer region at the wall surface of the plurality of cooling holes and an inner region. An average size of the plurality of particles in the inner region is larger than an average size of the plurality of particles in the outer region.

In a further example of any of the foregoing, the particles include carbides or oxides.

In a further example of any of the foregoing, the particles have a lower thermal conductivity than the ceramic matrix composite material.

In a further example of any of the foregoing, the component is a component of a gas turbine engine.

DETAILED DESCRIPTION

Figure 1:
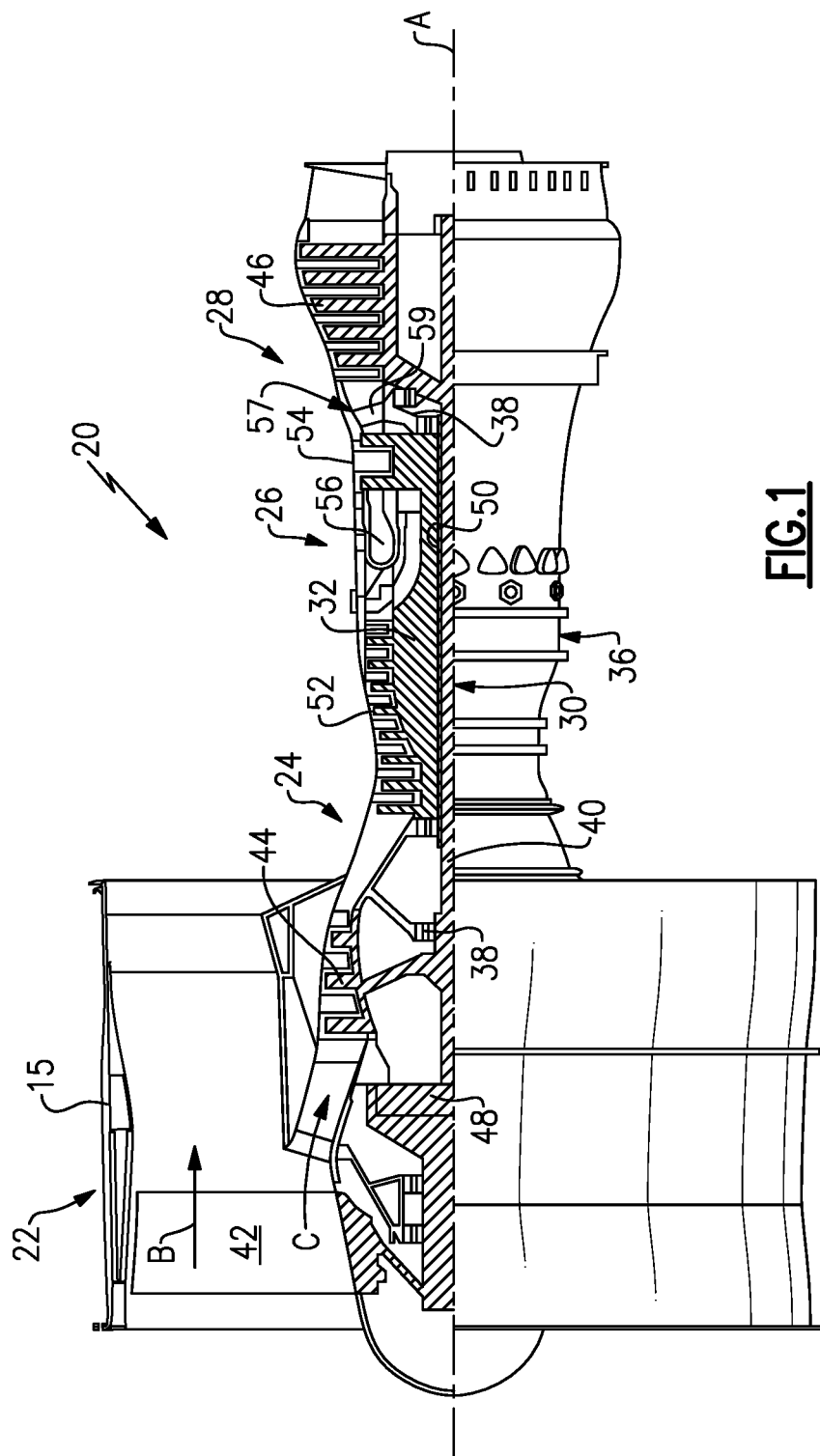
FIG. 1 schematically shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46, The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Alternatively, the low pressure compressor 44 includes a forward hub 45A and an aft hub 45B driven by the inner shaft 40.

Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. In the illustrated example, the mid-turbine frame 57 only includes a bearing system 38 that supports the high spool 50 and the mid-turbine frame 57 does not support the low speed spool 30. Additionally, a pair of bearing systems 38E are located adjacent a downstream end of the low speed spool 30 adjacent an exhaust outlet of the gas turbine engine to support the low speed spool 30. Furthermore, a bearing assembly 38C can be located radially inward from the combustor 56 and supported by a diffuser case and be used in place of or in addition to the bearing system 38 associated with the mid-turbine frame 57. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C, The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49. In one example, the low pressure compressor 44 includes at least 4 stages and no more than 7 stages and in another example, the low pressure compressor 44 includes at least 5 stages and no more than 7 stages. In both examples, the high pressure compressor 52 includes more stages than the low pressure compressor.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. With the planetary gear system, the ring gear is fixed from rotation relative to the engine static structure 36 and the carrier rotates with the fan 42. With the star gear system, the carrier is fixed from rotation relative to the engine static structure 36 and the ring gear rotates with the fan 42. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0 4.2. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0, Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters), The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of [(Tram °R)/(518.7° R)]0.5. The corrected fan tip speed can be less than or equal to 1150.0 ft/second (350.5 meters/second), and can be greater than or equal to 1000.0 ft/second (304.8 meters/second).

Some of the components of the gas turbine engine 20, such as airfoils in the turbine section 28, can be made of ceramic matrix composite (CMC) materials. In general, CMC components include ceramic-based reinforcements, such as fibers, in a ceramic-based matrix. CMC components optionally include coatings that can provide mechanical, thermal, and/or environmental protection to the underlying CMC material.

In the example where the reinforcements are fibers, the fibers can be arranged in a variety of ways that are known in the art, such as unidirectionally, various weaves, braids, etc. in some more particular examples, the fibers can be arranged in bundles or tows. However, it should be understood that other non-fiber reinforcements such as grains or particles are also contemplated.

Figure 3:
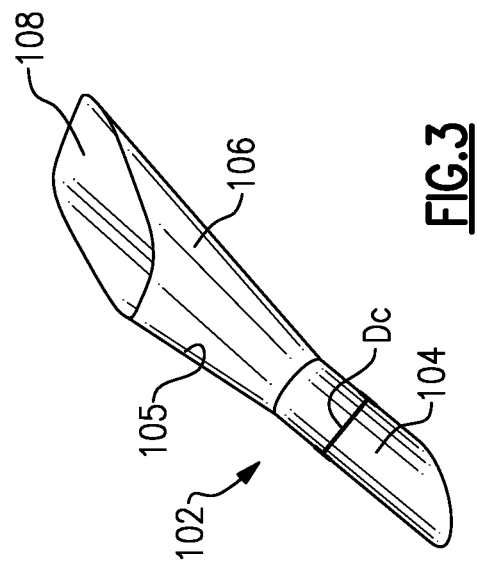
FIGS. 3 and 4 schematically show a detail view of the cooling hole in the component of FIG. 2.
Figure 2:
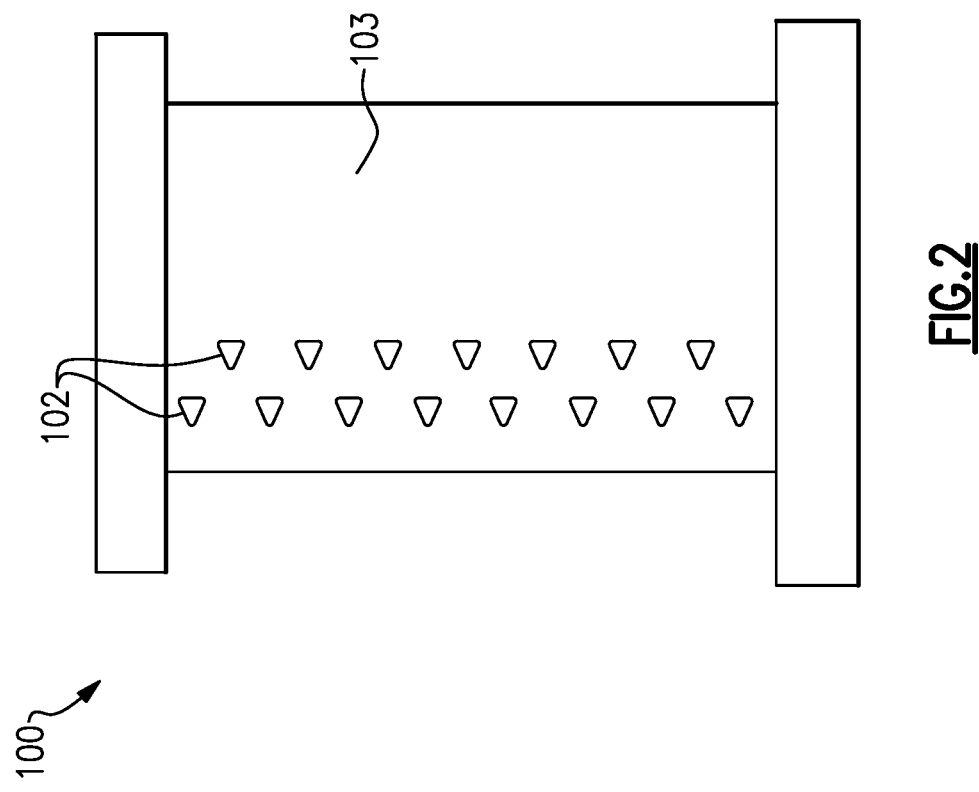
FIG. 2 schematically shows an example ceramic matrix composite component.

Some CMC components include cooling holes, and more particularly, cooling holes operable to provide film cooling to a surface of the CMC component. FIG. 2 shows a detail view of an example CMC component 100 with cooling holes 102. FIG. 3 schematically shows a detail view of the cooling holes 102. In this example, the CMC component is an airfoil, through other components are contemplated. Additionally, it should be understood that the arrangement, number, and size of the cooling holes 102 depicted in FIG. 2 is exemplary, and other cooling hole schemes are contemplated by this disclosure.

Various types of cooling via cooling holes are known in the art. Some cooling holes, for instance, provide a pathway for cooling air to flow through a component and remove heat through the thickness of the component by heat transfer between the cooling hole walls and the cooling air. Other cooling holes receive cooling air and jet it along a surface of the component so that the cooling air cools the surface by heat transfer between the surface and the cooling air. This is known as film cooling. In the example of FIGS. 2-3, the cooling holes 102 are film cooling holes.

Figure 4:
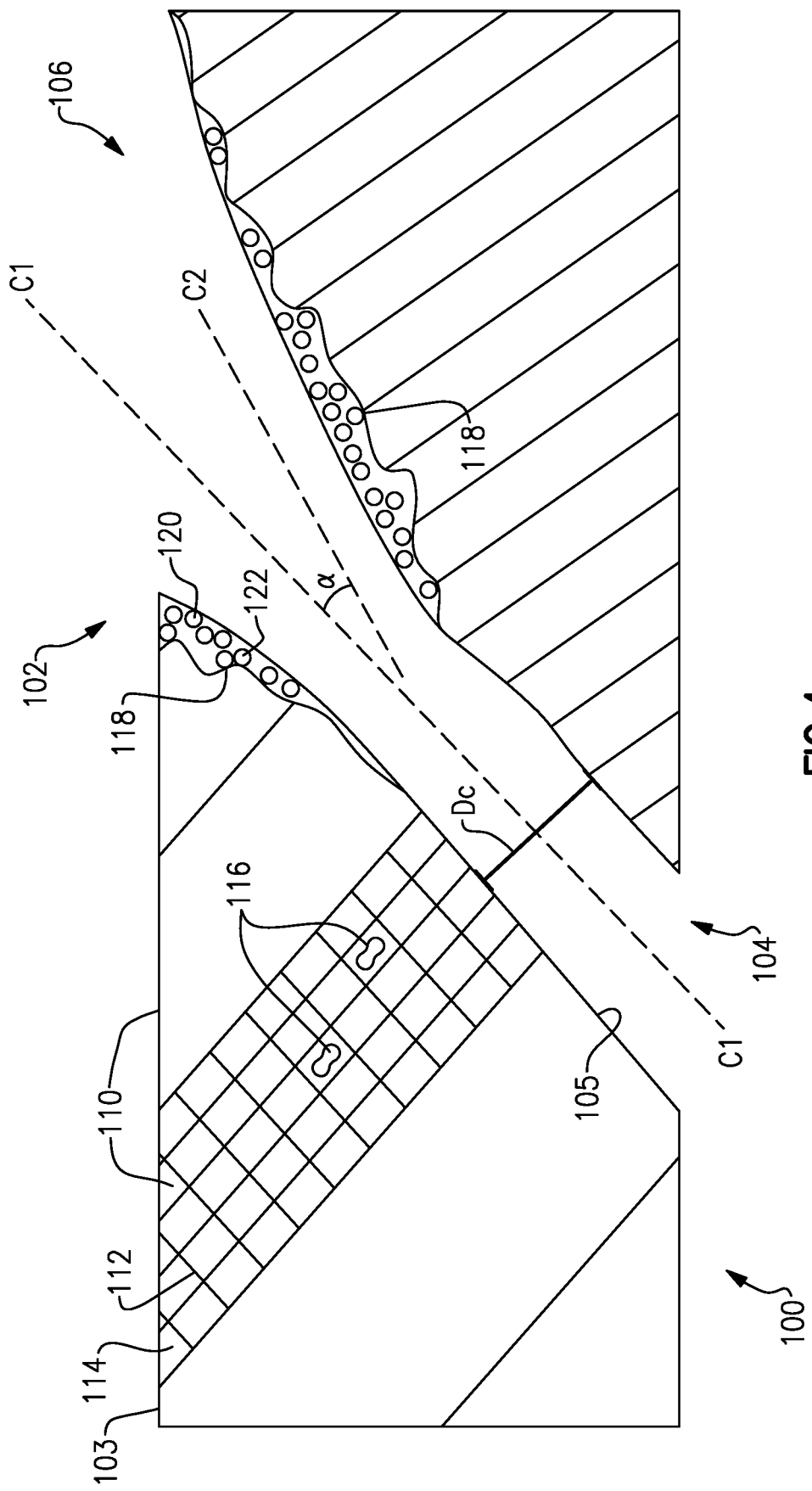

As shown in FIGS. 3-4 the film cooling hole 102 includes a metering portion 104 and a diffuser portion 106. The metering portion 104 and diffuser portion 106 are defined by a cooling hole wall 105. The metering portion 104 has a diameter $D_c$. The metering portion 104 extends along a first cooling hole axis C1 and the diffuser portion 106 extends along a second cooling hole axis C2 which is angled with respect to the first cooling hole axis C1 by an angle α. The angle α is generally less than 90 degrees. The diffuser portion 106 has an opening 108 which opens at a surface 103 of the CMC component 100. Cooling air generally travels through the metering portion 104, through the diffuser portion 106, and out of the cooling hole 102 along the surface 103 of the CMC component 100 to provide cooling to the surface 103 as is known in the art.

The cooling hole wall 105 may have a surface roughness which could be due to the porous nature of the CMC material of the CMC component 100 and/or due to the method of formation of the cooling hole 102, which can be drilling, for example. The surface roughness can decrease the film cooling efficiency of cooling provided by cooling air traveling through the cooling hole 102 by causing increased frictional interaction between the cooling air and the cooling hole wall 105. This increased frictional interaction can cause pressure loss in the cooling air. Additionally, the increased frictional interaction can enhance heat transfer between the cooling air and the cooling hole wall, thereby increasing the temperature of the cooling air as it exits the opening 108, and decreasing the film cooling effectiveness of the cooling air as it travels out of the cooling hole 102 and along the surface 103 of the component 100. Moreover, the surface roughness can cause the shape of the opening 108 of the cooling hole 102 to deviate from a desired geometry. As the geometry is selected to maximize film cooling effectiveness, deviation from the desired geometry can reduce film cooling effectiveness and reliability.

With reference to FIG. 4, in this example, the CMC component 100 includes several plies 110 or layers of CMC material stacked and bonded to one another to form the three-dimensional CMC component 100. Each of the plies 110 includes a plurality of ceramic-based fibers 112 in a ceramic-based matrix material 114. The fibers 112 can be woven or can have other arrangements as would be known in the art. In some examples, the fibers 112 can be arranged in bundles or tows which are also known in the art.

As shown, the cooling holes 102 are oriented so that the first cooling hole axis C1 is approximately normal to the plane of the plies 110 and to the plane of any spaces between adjacent plies 110. As used herein, the terms "approximately" and "about" have the typical meaning in the art, however in a particular example "about" or "approximately" can mean deviations of up to 10% of the values described herein.

The matrix material 114 can have pores 116. The pores 116 can have an average diameter that is up to about 50% of the diameter $D_c$ of the metering portion 104 of the cooling holes 102. The pores 116 can be located throughout the matrix material 114 including at the cooling hole wall 105. The pores 116 can be formed during infiltration of the matrix material 114 to the fibers 112 by processes that are known in the art. For instance, chemical vapor infiltration (CVI) is an effective and direct method of infiltration but it is known to lead to higher porosity matrices than other infiltration methods.

As shown in FIG. 4, the cooling hole wall 105 has a rough surface which is formed at least in part by pores 116 at the cooling hole wall 105, but can also be formed by the process of forming the cooling holes 102 as discussed above. The surface roughness can be in the metering portion 104, the diffuser portion 106, or both. A filler material 118 is disposed at the cooling hole wall 105 to reduce the surface roughness by filling in pores 116 and any other deformities at the cooling hole wall 105. The filler material 118 includes particles 120. In some examples, the particles 120 are carbide particles such as SiC or oxide particles such as $HfO_2$, $HfSiO_4$, $Yb_2O_3$, $Yb_2Si_2O_7$, $SiO_2$, or other oxides which are known in the art.

In some examples, the material of the particles 120 can be selected to reduce the thermal conductivity of the surface of the cooling hole walls 105, e.g., the material of the particles 120 has a lower thermal conductivity than the CMC material of the CMC component 100. In this way, the filler material 118 reduces heat transfer between the CMC component 100 and cooling air traveling through the cooling hole 102, thereby improving the efficacy of film cooling once the cooling air exits the cooling hole 102 as discussed above.

The size (diameter) and size distribution of the particles 120 is selected to provide a desired packing density in the pores 116/deformities at the cooling hole wall 105. In general, the greater the packing density, the higher the volume of the pores 116/deformities filled by the filler material 118, and the greater the reduction in surface roughness at the cooling hole wall 105. By reducing the surface roughness, the filler material 118 improves the efficacy of film cooling for the CMC component by reducing frictional losses exhibited by the cooling air associated with the interaction of undesired roughness within the cooling hole walls 105 with the cooling air, as discussed above. Moreover, the filler material 118 enables the use of relatively higher porosity matrix 114 materials by reducing the debit to the effectiveness of film cooling provided by the cooling holes 102 that would be seen in high porosity matrices 114. Therefore, effective matrix 114 infiltration methods such as CVI can be used.

The particles 120 can have a monomodal, bimodal, or trimodal size distribution. The filler material 118 can also include additives 122 such as glass additives. Example glass additives 122 includes borosilicate glass or alkaline earth-alumino silicate glass. Additives 122 can improve the manufacturability of the CMC component 100 by the method 200 discussed below. Additives 122 may also improve the final properties of the filler material 118. For instance, additives 122 may participate in decreasing the surface roughness of the filler material 118 by filling in between filler particles 120.

Figure 5:
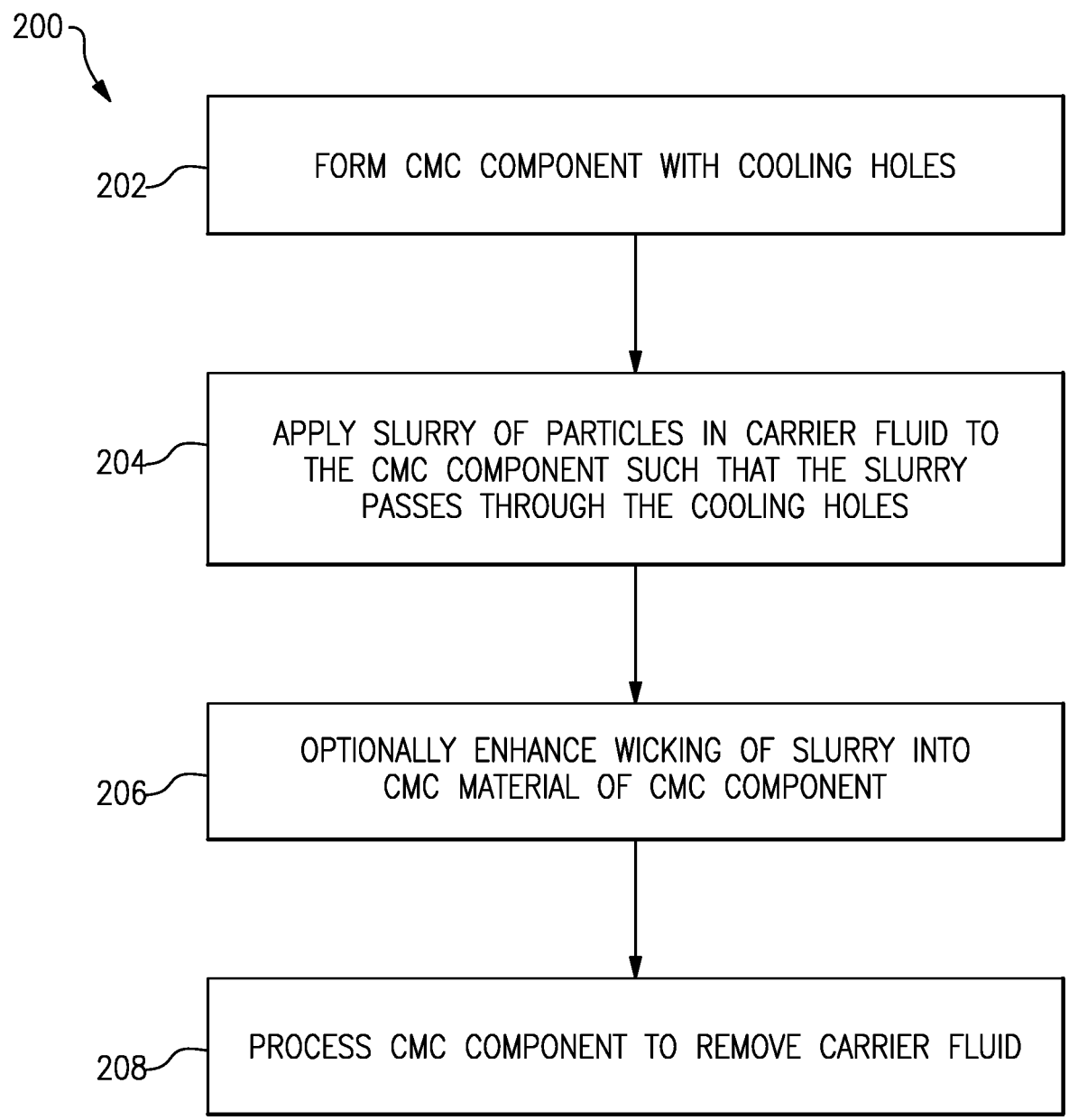
FIG. 5 shows a method of making the ceramic matrix composite component of FIGS. 2-4.

FIG. 5 shows an example method 200 for making the CMC component 100. In step 202, a CMC component 100 with cooling holes 102 is formed by any method known in the art. For instance, plies 110 of fibers 112 are arranged in a to a desired structure, and the structure is infiltrated with the matrix 114 by CVI or another method known in the art. In some examples, the porosity of the resulting structure after matrix 114 infiltration by CVI is between about 1 and 25%, and in more particular examples is about 10%. The cooling holes 102 are formed in the CMC component 100 by drilling or another known method. In some examples, the formation of cooling holes 102 causes the porosity of the matrix 114 to increase. Step 202 can also include densification or curing steps as are known in the art. Step 202 may also include the application of one or more coatings to the CMC component 100.

In step 204, a slurry including particles 120 and optional additives 122 in a carrier medium is applied to the CMC component 100 such that the slurry passes through the cooling holes 102 and coats the cooling hole walls 105. The application can be by painting the slurry onto the CMC component 100, by dipping the CMC component 100 into the slurry, by injecting the slurry into the cooling holes 102, or by other methods. As the slurry passes through the cooling holes 102, the slurry wicks in to the CMC material via the cooling hole walls 105, pulling the particles 120/optional additives 122 into the pores 116/deformities to reduce the surface roughness of the cooling hole walls 105 as discussed above. The slurry may include optional surfactants to enhance the capillary driving force causing the wicking of the slurry into the CMC component 100. The slurry may also include suspension stabilizers to decrease the drying time of the slurry.

The carrier medium can be water in some examples.

In other examples, the slurry can include preceramic polymer particles 120 such as polycarbosilane that can be cured to form a ceramic material as part of the filler 118 to assist in filling in the pores 116/deformities at the cooling hole wall 105. The perceramic polymer could be included instead of, or in addition to other types of particles 120. The ceramic resulting from curing the preceramic particles can be the same or different than the matrix 114. In this example, the carrier medium can be a solvent such as toluene in which the preceramic polymer dissolves. In other examples, the preceramic polymer can be provided in liquid form and can be included in the carrier fluid. In this example, the liquid preceramic polymer can be calcined to produce perceramic polymer particles 120, or could even be calcined at a high temperature to produce ceramic particles 120 prior to application of the slurry in step 204.

In some examples, the slurry is a colloidal solution of particles 120/optional additives 122 in the carrier medium. In a more particular examples, the particles 120 can be selected as precursors for an integrated network suitable for a sol-gel deposition process.

In a particular example, step 204 is performed with a first slurry and then is repeated with a second slurry. For instance, the first slurry has a relatively low viscosity, low surface tension, and high permeability into the CMC material as compared to the second slurry. The first slurry has a relatively lower concentration of particles 120 as compared to the second slurry and the particles 120 have a larger average size than particles 120 in the second slurry. The application of the first slurry wicks into the CMC material to limit the depth of pores 116/deformities at the cooling hole walls 105. The second slurry has a relatively higher concentration of relatively smaller particles 120 as compared to the first slurry. The application of the second slurry fills in gaps that remain after application of the first slurry, such as gaps between larger particles 120. In this example, therefore, the filler 118 has an outer region at a surface of the cooling hole walls 105 that has small average particle 120 size and an inner region with larger average particle 120 size. In general, the smaller the particles 120 at the outer surface of the cooling hole wall 105, the lower the surface roughness of the cooling hole wall 105.

As discussed above, the application of a slurry to the CMC component 100 in step 204 causes the slurry to wick into the CMC material. In step 206, which is optional, the wicking of the slurry into the CMC material can be enhanced by a drawing step, such as spinning the CMC component 100 or pressing the CMC component 100 in a mold or tool.

In step 208, the CMC component 100 is processed to evaporate or otherwise remove the carrier fluid from the CMC component, leaving the particles 120/optional additives 122 behind. The processing can include heating or other steps, depending on the character of the carrier fluid. The processing can also include heat treatment or curing steps, which can promote bonding of the filler 118 to the component 100 and/or bonding of the particles 120 to one another. In some examples, additives 122 such as the example glass additives discussed above are selected to reduce the temperature needed to achieve the heat treatment or curing. Where preceramic polymer is included in the slurry, the processing in step 208 can include curing the preceramic polymer into a ceramic according to any known method.

In some examples, the processing in step 208 can occur during post-processing of the CMC component 100 such as during densification steps or coating application steps. That is, in this example, the slurry application step 204 is performed before final processing of the CMC component 100.

In some examples, after step 208, the step of forming cooling holes 102 is optionally repeated by any of the example methods employed in step 202 discussed above. This ensures that the cooling holes 102 maintain the desired geometry and size after steps 204 through 208 are performed. Additionally, It should be understood that though the cooling holes 102 discussed herein are film cooling holes, the present disclosure is applicable to other types of cooling holes as well as other surfaces of CMC components.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of making a ceramic matrix composite component, comprising:
    forming a ceramic matrix composite component by infiltrating an array of ceramic-based fibers with a ceramic-based matrix;
    forming a plurality of cooling holes in the ceramic matrix composite component;
    after forming the plurality of cooling holes in the ceramic matrix composite component, applying a slurry of particles in a carrier fluid to the ceramic matrix composite component such that the slurry passes through the cooling holes and wicks into the ceramic matrix composite material; and
    processing the ceramic matrix composite component to remove the carrier fluid, thereby leaving a filler at a wall surface of the plurality of cooling holes,
    wherein the slurry is a first slurry and the particles are a first plurality of particles, and further comprising applying a second slurry having a second plurality of particles to the first slurry, wherein the second plurality of particles have a smaller average particle size than the first plurality of particles.

2. The method of claim 1, wherein after applying the first slurry an inner region of the filler including the first plurality of particles is formed and after applying the second slurry an outer region of the filler including the second plurality of particles is formed.

3. The method of claim 1, wherein the slurry further includes glass additives.

4. The method of claim 1, wherein the slurry further includes a surfactant.

5. The method of claim 1, wherein the infiltrating is by chemical vapor.

6. The method of claim 1, wherein the slurry is a colloidal solution.

7. The method of claim 1, wherein the particles are carbides or oxides.

8. The method of claim 1, wherein the particles include preceramic polymer particles, and further comprising curing the preceramic polymer particles to form a ceramic.

9. The method of claim 1, wherein the processing occurs during a step of densifying or curing the ceramic matrix composite component.

10. The method of claim 1, wherein the processing occurs during a step of applying a coating to the ceramic matrix composite component.

11. A component, comprising:
    a ceramic matrix composite material including an array of ceramic-based fibers disposed in a ceramic-based matrix;
    a plurality of cooling holes formed through the ceramic matrix composite material; and
    a filler at a wall surface of each of the plurality of cooling holes, the filler including a plurality of particles filling in surface roughness at the cooling hole wall surfaces,
    wherein the filler includes an outer region defining the wall surface of the plurality of cooling holes and an inner region located between the ceramic matrix composite material and the outer region, and wherein an average size of the plurality of particles in the inner region is larger than an average size of the plurality of particles in the outer region.

12. The component of claim 11, wherein the filler includes glass additives.

13. The component of claim 11, wherein the plurality of cooling holes are film cooling holes having a metering section and a diffuser section.

14. The component of claim 13, wherein the array of ceramic-based fibers includes plies of the ceramic-based fibers, and wherein the metering section extends along an axis that is normal to a plane of the plies.

15. The component of claim 13, wherein the ceramic-based matrix has a plurality of pores having an average pore diameter that is up to about 50% of a diameter of the metering section.

16. The component of claim 11, wherein the plurality of particles include carbides or oxides.

17. The component of claim 11, wherein the plurality of particles have a lower thermal conductivity than the ceramic matrix composite material.

18. The component of claim 11, wherein the component is a component of a gas turbine engine.

* * * * *